United States Patent [19]
Bauer

[11] 3,755,673
[45] Aug. 28, 1973

[54] FILM HOLDER

[75] Inventor: Manfred Bauer, Hamburg, Germany

[73] Assignee: U.S. Philips Corporation, New York, N.Y.

[22] Filed: Feb. 16, 1972

[21] Appl. No.: 226,874

[30] Foreign Application Priority Data
Apr. 14, 1971 Germany .................. G 71 14 217.1

[52] U.S. Cl. .................................................. 250/480
[51] Int. Cl. ........................................... G03b 41/16
[58] Field of Search ....................................... 250/68

[56] References Cited
UNITED STATES PATENTS
2,494,740  1/1950  Boucher ............................... 250/68

Primary Examiner—James W. Lawrence
Assistant Examiner—C. E. Church
Attorney—Frank R. Trifari

[57] ABSTRACT

A film holder, in particular for x-ray films, comprising a holding device for films which is provided on a film holder plate and which comprises a cloth or foil which is subjected to tensile forces and which is stretched over an edge of the film holder plate.

5 Claims, 1 Drawing Figure

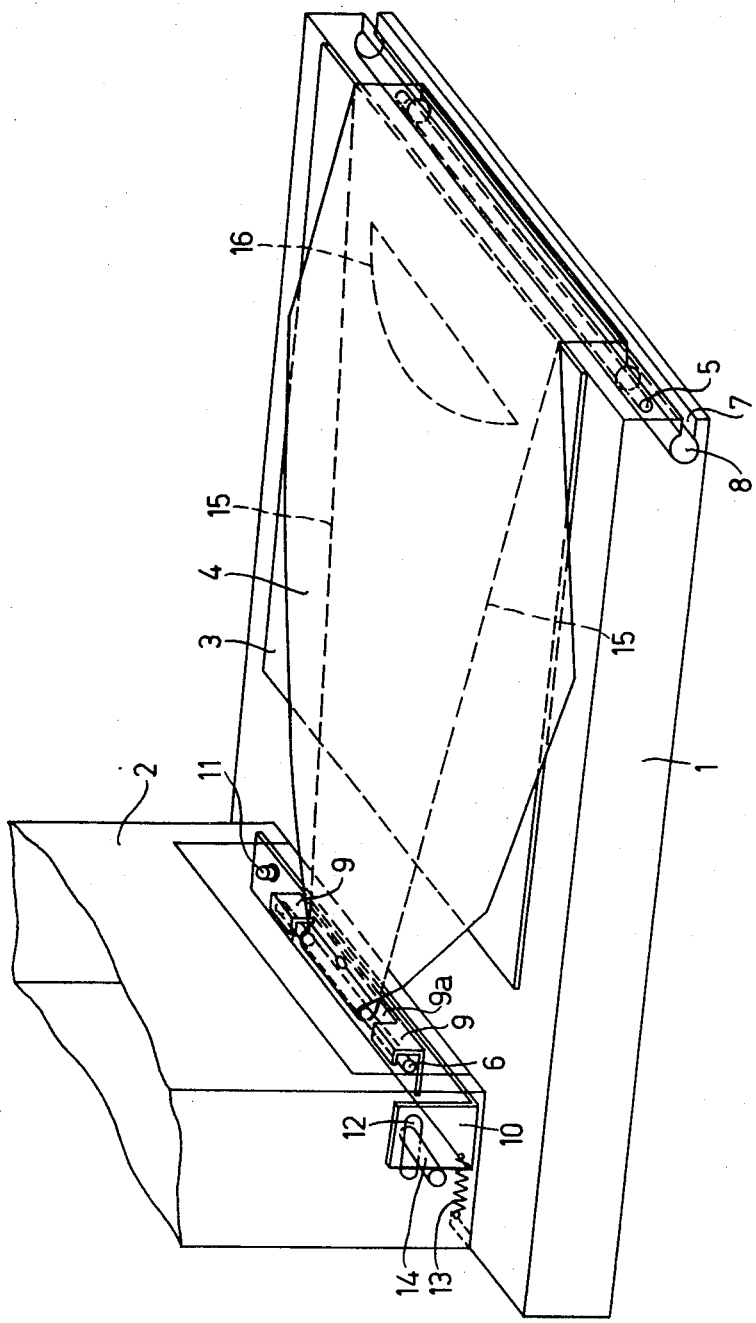

FILM HOLDER

The invention relates to a film holder, in particular for X-ray films, comprising a holding device which is mounted on a film holder plate. A great variety of film holders, in particular for X-ray films, are known. While complicated film holders (so-termed film cassettes) are used in comparatively large X-ray apparatus, simple film holders are known for use in comparatively small X-ray apparatus, for example, for mammography. These simple film holders usually limit the number of examinations which can be performed per unit of time, as the insertion of the film is rather cumbersome. For X-ray apparatus for mammography, for example, film holders are known comprising film holder plates on which guide rails with film clamps are mounted.

In such film holders it is difficult to secure the film to be exposed on the film holder plate in a flat and defined manner and to place films of different size (in length, as well as in width and in thickness) rapidly in an arbitrary succession. Moreover, in film holders commonly used thus far, it was found to be impossible to make the often required markings, for example, of measuring fields for dose measurements or exposure sizes.

The invention has for its object to eliminate these drawbacks, and to this end it is characterized in that the holding device comprises a cloth or foil which is stretched over an edge of the film holder plate. In order that the invention may be readily carried into effect, one embodiment thereof will now be described in detail, by way of example, with reference to the accompanying diagrammatic drawing.

DESCRIPTION OF THE PREFERRED EMBODIMENT

The film holder shown in the Drawing comprises a film holder plate 1 which is secured to a support 2. Situated on the film holder plate 1 is a film 3 which is provided underneath a cloth or foil cover sheet 4. Hereinafter the term foil 4 will be used for the sake of simplicity, but various kinds of cloth are also very suitable.

The foil 4, for example, a plastic foil having a low radiation absorption, is secured to a rod 5 near a first end and to a rod 6 near a second end. The rods 5 and 6 are slid into a cylinder which is obtained, for example, by bending the foil ends, said cylinder extending over the entire width of the foil. The film holder plate 1 is provided with a slit 7 and an adjoining space, a bore-hole 8 in the embodiment shown, whose transverse dimension is larger than the slit 7. The slit 7 and the bore-hole 8 have open ends, viewed in their longitudinal direction.

The foil 4 is secured at one end in the film holder plate 1 by inserting the rod 5 into the bore-hole 8. The foil then glides through the slit 7. The diameter of the rod 5 in the bore-hole 8 exceeds the height of the slit 7. The rod 5 ensures uniform bearing of the foil 4 over the relevant edge of the film holder plate 1.

At the other end the foil 4 is held in two clamps 9 by means of a rod 6. The clamps 9 are situated on a bar 9a which is located in a rotatable manner on a lever 10. One end 11 of the lever 10 is located in a rotatable manner, its opposite end being guided in an elongated hole 12. A tension spring 13, secured to the lever 10, permanently pulls the lever 10 and hence the foil 4 in a tight position, thus preventing lateral displacement of the foil 4. As the clamps 9 are secured to the rotatable bar 9a, sufficient tensile force is transferred to the foil 4 in any position of the lever 10.

The stroke of the lever which is guided in the elongated hole 12 by means of a pin 14 is such that the foil 4 can be readily unhooked in the released condition. The foil 4 has three adjoining trapezium-shaped areas so that the film 3 can be inserted in an area of the foil 4 where no tensile forces are present. This area is situated outside the broken lines 15 in the drawing. The foil 4 preferably has portions which are situated outside the tensile force field. The foil 4 can also serve as a carrier for markings 16, which remain visible also after the film 3 has been inserted.

It will be obvious that a film holder according to the invention offers the advantage of being suitable for a comparatively large number of film sizes. The shifting of the film on the film holder plate 2 due to the displacement of the object to be examined, of particular interest for mammography, is substantially precluded when using a film holder according to the invention.

What is claimed is:

1. Apparatus for releasably holding a piece of X-ray film flat, comprising: a substantially rigid plate having a top surface for supporting the film, a flexible cloth or foil cover sheet having low radiation absorption positioned upon said surface and having first and second spaced-apart portions, the film being positionable and held flat between said sheet and surface, first means for fixedly holding the first portion of said cover to said plate, second means for movably holding said second portion of said cover to said plate, third means for resiliently urging said second means away from said first means and thereby tensioning said cover sheet therebetween.

2. Apparatus according to claim 1 wherein said cover sheet has a length dimension extending between said first and second portions, said first and second portions have transverse dimensions with a tensioning force extending in a field lengthwise between said portions, said cover sheet has a middle portion intermediate said first and second portions that has width greater than each of said transverse dimensions, thereby defining side portions of said cover sheet external of said field of tensioning.

3. Apparatus according to claim 1 wherein said cover sheet has a length dimension extending between said first and second portions, said first and second portions have width dimensions transverse said length with a field defined lengthwise between said first and second portions, said cover sheet has a middle portion intermediate said first and second portions that has width greater than each of said first and second portion widths, whereby said tensioning creates tension in said field of the sheet.

4. Apparatus according to claim 3 wherein said cover sheet further comprises externally visible markings thereon.

5. Apparatus according to claim 3 wherein said first and second means respectively each comprise a rod attached to a corresponding portion of said cover sheet, and receptacle means for receiving and holding said rod.

* * * * *